June 12, 1923.                                        1,458,203
                      P. TANNER
          RESERVE FUEL SYSTEM FOR AUTOMOBILES
                  Filed May 16, 1922
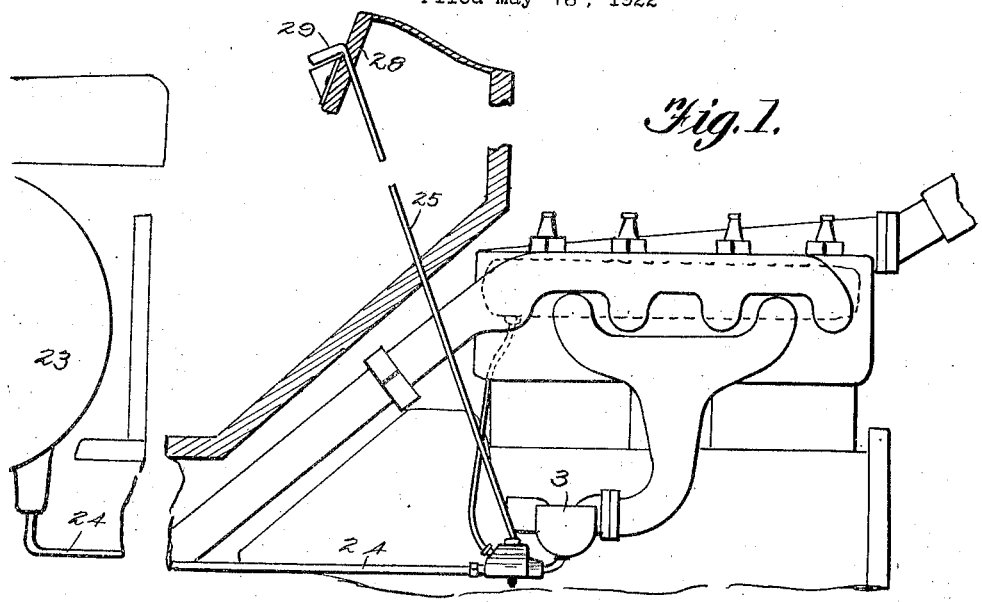
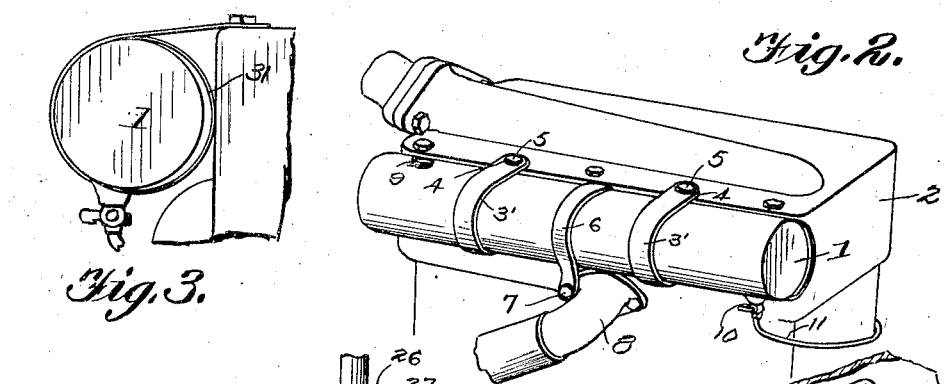
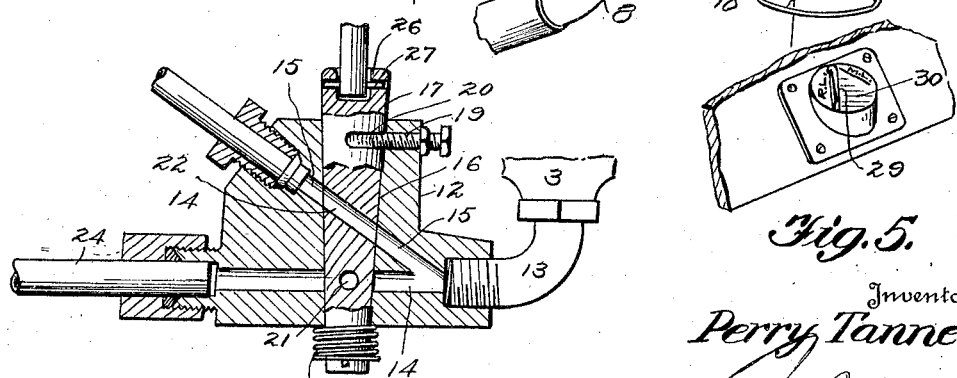
Inventor
Perry Tanner.
Attorney Patented June 12, 1923.

1,458,203

UNITED STATES PATENT OFFICE.

PERRY TANNER, OF ASHLAND, KENTUCKY.

RESERVE FUEL SYSTEM FOR AUTOMOBILES.

Application filed May 16, 1922. Serial No. 561,260.

*To all whom it may concern:*

Be it known that I, PERRY TANNER, a citizen of the United States of America, residing at Ashland, in the county of Boyd and State of Kentucky, have invented certain new and useful Improvements in Reserve Fuel Systems for Automobiles, of which the following is a specification.

The invention relates to a reserve fuel supply for gasoline engines in motor vehicles, in the use of which, and at the will of the driver, a normally reserve supply of fuel may be drawn upon.

The invention is particularly adapted for use in connection with Ford automobiles, in which, with the main tank partially filled, the automobile in climbing a steep grade may and frequently does elevate the carbureter above the level of the fuel in the main tank, hence the gravity feed from the main tank fails and the engine stops. Furthermore, it not infrequently happens that the main fuel supply pipe becomes clogged, or the vacuum tank, if such system is used, becomes inoperative. Under any of these conditions, the driver, by the simple manipulation of a rod, will control a valve which serves to cut off the main supply pipe from the carbureter and connect to such carbureter an emergency supply pipe leading from an emergency tank supported on the cylinder block in a manner to thus maintain the emergency supply above the carbureter under any and all conditions.

The essential characteristics of the invention therefore are an emergency fuel tank of a size to contain at least a gallon of fuel, removably supported on the engine block, preferably on the side opposite that on which the carbureter is located, with a gravity feed pipe leading from such emergency tank to a valve arranged on the inlet side of the carbureter. The feed pipe from the main fuel tank also leads through this valve, and the valve is constructed to open either the main fuel pipe or emergency fuel pipe for supplying the carbureter. The valve is controlled through a rod leading to and through the instrument board of an automobile and mounted with such relation to an indicator that the driver can tell at a glance whether the carbureter is being supplied from the main fuel tank or the emergency fuel tank.

An important feature of the present invention is the construction and arrangement of details which will permit the application of the device to the present type of Ford automobiles without change, the tank being adapted for removable connection to the engine, and the valve being arranged to be interposed between the main fuel pipe of the present construction and the carbureter inlet.

The invention is illustrated in the accompanying drawings, in which:

Fig. 1 is a view in elevation partly in section showing the application of the improved emergency fuel supply device.

Fig. 2 is a perspective view illustrating the mounting of the emergency fuel tank.

Fig. 3 is an end elevation of the same.

Fig. 4 is a sectional view illustrating the fuel control valve.

Fig. 5 is a broken perspective view showing the valve position indicator.

The emergency fuel tank 1 of the present system is preferably arranged immediately adjacent the cylinder block 2, on the side opposite that on which the carbureter 3 is located. The fuel tank is preferably cylindrical and of a size to receive a gallon or more of fuel. It is removably supported in place by metal straps 3' which encircle the tank and have their ends formed with openings 4 to slip over the engine head bolts 5 of the present construction. The tank is fixed against movement relative to the supports thus provided by providing a central band 6, which encircles the tank, the ends of which band 6, are secured beneath one of the bolts 7 of the water connection 8. The tank has a suitable filling opening closed by a cap 9 and a valve controlled outlet 10, from which extends the emergency fuel supply pipe 11.

The supply pipe 11 extends around the rear of the block and to and in communication with a valve casing 12. The valve casing 12 is removably connected to the carbureter intake 13 and is formed with a main passage 14 and an auxiliary passage 15, both said passages leading to the carbureter supply pipe 13 and diverging therefrom, as shown in Fig. 4. The passages 14 and 15 are interrupted by a valve bore or seat 16, in which is mounted a conical valve 17. The valve is held to its seat by a spring 18 and limited in its rotary movement through the medium of a set screw 19 engaging with a channel 20 of suitable length formed in the valve. The valve is formed with diametrically opposed passages 21 and 22, adapted when the valve is in proper position to establish continuity of the passages 14 and 15. As the valve passages or ports 21 and 22 are diametrically opposed, it is apparent that with the valve turned so as to cause the port 21 to open the passage 14 through the casing, the passage 15 will be cut off, the turning of the valve to its opposite position opening the passage 15 and cutting off the passage 14.

The emergency tank supply pipe 11 is removably connected with the valve casing 12 in line with the fuel passage 15 through such casing. The main or usual fuel tank 23 has the main fuel supply pipe 24 connected with the valve casing 12 in line with the passage 14 through such casing. Thus by manipulation of the valve 17, either the main tank 23 or the emergency tank 1 may be utilized as a fuel supply for the carbureter, it being apparent that with either tank 23 or 1 in use for service, the other tank is absolutely cut off.

The valve 17 is controlled through a rod 25 having a removable connection with the valve, as by seating the end of the rod in a recess 26 in the upper end of the valve and passing a pin 27 through the valve and rod. The upper end of the rod passes through the dash 28 of the vehicle and is formed to provide a lateral handle portion 29 by which the rod, and therefore the valve, may be manipulated. The handle portion 29 preferably overlies an indicator, adapted to be removably secured to the instrument board and having a face portion 30 marked to indicate the opposite positions of the valve, and the fuel supply in such position, as for example, such face might be marked on one side of the center with the letters R. L., indicating the reserve line open, and on the other side of the center the letters M. L., indicating the main line open. Thus with the handle 29 in one position or the other, the driver can tell at a glance which supply is open to the carbureter, and may of course through proper movement of the valve 17 through the handle 29, change such supply at will.

It is to be particularly noted that the apparatus as a whole is designed for convenient and ready installation on the particular type of automobile for which it is provided. The emergency fuel tank 1 may be readily secured in place by merely removing one of the bolts 7, and reapplying said bolt through the ends of the band 6 after the tank has been positioned by slipping the ends of the bands 3' over the projecting heads of the engine head bolts 5. The main fuel line 24 is then disconnected from the carbureter and the valve casing 12 interposed, the emergency fuel pipe line 11 and the main fuel line 24 being connected to the casing. The rod 25 is then extended through a hole formed in the instrument board and connected to the valve 17, the indicator 30 being secured in place. Thus the installation requires merely the application of an opening through the dash and the securing of the indicator to the dash, all other connections and mountings entirely avoiding any necessity for any change whatever in the present arrangement and construction.

If desired, a heat deflecting baffle plate 31 may be interposed between the tank 1 and the engine to form a space for the passage of air, to avoid undue heating of the reserve supply of gasoline.

With the fuel from the main tank properly reaching the carbureter, it is not necessary to disturb the emergency supply. If for any reason the main supply proves inadequate, as for example, the exhaustion of such main supply, the inclination of the automobile to raise the carbureter 3 above the level of the supply in the main tank; the clogging of the main supply pipe 24, or the failure of the vacuum tank if such system is used, the operator merely shifts the valve handle 29 to the reserve line indication, whereupon the reserve fuel tank 1 is immediately open to the carbureter and the main line pipe 24 cut off. This precludes any possibility of the fuel from the reserve tank 1 flowing back into the main tank.

It will be noted that the reserve fuel tank is in a plane above the carbureter, and that the supply pipe 11 from such tank has practically a direct vertical supply to the carbureter. Hence there is no possibility of the emergency or reserve supply failing in its delivery to the carbureter.

What I claim is:

1. In combination with a motor vehicle having a motor, a carbureter, a main fuel supply tank, a main fuel supply pipe leading from the main fuel supply tank, an auxiliary fuel supply tank mounted on the motor and above the horizontal plane of the carbureter, means for spacing the auxiliary fuel supply tank from the motor to form an air passage between said tank and the motor to cool the liquid fuel in the tank, an auxiliary fuel supply pipe extending from the auxiliary fuel supply tank, a valve casing with which the main and auxiliary fuel supply pipes communicate, a pipe connecting said casing and the carbureter, a valve in the casing for controlling the flow of fuel through the main and auxiliary fuel supply pipes, and an operating handle extending from the valve to within reach of the operator of the vehicle.

2. In combination with a motor vehicle having a motor, bolts for securing the head to the motor, a carbureter, a main fuel supply pipe communicating with the carbureter, an auxiliary fuel supply tank located adjacent the upper portion of the motor, a spacing strip interposed between the motor and the auxiliary fuel supply tank to cool the latter, bands secured to the latter tank and extending over the motor and fastened by the bolts which secure the head, and a valve for controlling the fuel passing through the main and auxiliary fuel supply pipes.

In testimony whereof I affix my signature.

PERRY TANNER.